US012715344B2

(12) United States Patent
Ewald et al.

(10) Patent No.: US 12,715,344 B2
(45) Date of Patent: Aug. 25, 2026

(54) VEHICLE SEAT, IN PARTICULAR FOR AN AUTONOMOUSLY DRIVEN MOTOR VEHICLE

(71) Applicant: Adient US LLC, Plymouth, MI (US)

(72) Inventors: Tobias Ewald, Hueckeswagen (DE); Hilmar Wahlen, Hueckeswagen (DE); Juergen Otto, Leverkusen (DE); Antonios Simeonidis, Wuppertal (DE); Martin Koňak, Sklabiňa pri Martine (SK); Martin Kozáček, Trenčín (SK)

(73) Assignee: Adient US LLC, Plymouth, MI (US)

( * ) Notice: Subject to any disclaimer, the term of this patent is extended or adjusted under 35 U.S.C. 154(b) by 227 days.

(21) Appl. No.: 18/631,232

(22) Filed: Apr. 10, 2024

(65) Prior Publication Data

US 2024/0343166 A1 Oct. 17, 2024

(30) Foreign Application Priority Data

Apr. 11, 2023 (DE) ..................... 10 2023 109 073.9
Aug. 10, 2023 (DE) ..................... 10 2023 121 350.4

(51) Int. Cl.
*B60N 2/12* (2006.01)
*B60N 2/02* (2006.01)
*B60N 2/20* (2006.01)

(52) U.S. Cl.
CPC ........... *B60N 2/12* (2013.01); *B60N 2/02253* (2023.08); *B60N 2/20* (2013.01)

(58) Field of Classification Search
CPC .. B60N 2/3075; B60N 2/3077; B60N 2/3009; B60N 2/3011; B60N 2/3013; B60N 2/6045; B60N 2/3059; B60N 2/12; B60N 2/02253; B60N 2/02258; B60N 2/20
See application file for complete search history.

(56) References Cited

U.S. PATENT DOCUMENTS 11,351,897 B2 * 6/2022 Epaud .................... B60N 2/309
11,623,547 B2 * 4/2023 Epaud .................... B60N 2/309 297/326
2013/0341985 A1 * 12/2013 Tsuruta .................... B60N 2/12 297/354.1
2019/0092191 A1 * 3/2019 Bouzid .............. B60N 2/02246
(Continued)

FOREIGN PATENT DOCUMENTS

CN 113212258 A 8/2021
DE 19808235 C1 5/1999
(Continued)

*Primary Examiner* — Chi Q Nguyen
(74) *Attorney, Agent, or Firm* — Marshall & Melhorn, LLC

(57) ABSTRACT

A vehicle seat for an autonomously driven motor vehicle may have a seat substructure and a backrest which is articulated on the seat substructure. The seat substructure may have a base, a seat frame and adjustment kinematics which are effective between the base and the seat frame. The adjustment kinematics may have a first front swing arm, a second front swing arm and a rear swing arm. An angle between the first front swing arm and the second front swing arm may be adjustable by a linear drive. A first articulation point of the linear drive is articulated on the base to be pivotable about a sixth rotation axis. A second articulation point of the linear drive may be articulated on the second front swing arm to be pivotable about a seventh rotation axis.

11 Claims, 4 Drawing Sheets

(56) References Cited

U.S. PATENT DOCUMENTS

| | | | | |
|---|---|---|---|---|
| 2019/0308527 | A1 | 10/2019 | Nakamura et al. | |
| 2020/0101872 | A1* | 4/2020 | Epaud | B60N 2/3031 |
| 2020/0391622 | A1* | 12/2020 | Kajino | B60N 2/1814 |
| 2020/0391638 | A1* | 12/2020 | Watanabe | B60N 2/2222 |
| 2022/0332233 | A1* | 10/2022 | Gropp | B60N 2/643 |
| 2023/0063384 | A1* | 3/2023 | Kuntz | B60N 2/1615 |
| 2023/0068286 | A1* | 3/2023 | Kuntz | B60N 2/166 |
| 2023/0202357 | A1* | 6/2023 | Tang | B60N 2/02253 297/316 |
| 2023/0398917 | A1* | 12/2023 | Enns | B60N 2/995 |
| 2024/0294100 | A1* | 9/2024 | Kim | B60N 2/3031 |

FOREIGN PATENT DOCUMENTS

| | | | |
|---|---|---|---|
| DE | 102008053475 | A1 | 4/2010 |
| DE | 102016015170 | A1 | 6/2018 |
| DE | 102017103315 | A1 | 8/2018 |
| DE | 102018203731 | A1 | 9/2019 |
| DE | 102018122198 | A1 | 3/2020 |
| DE | 102021107896 | A1 | 9/2022 |
| DE | 102021202283 | A1 | 9/2022 |
| DE | 102021204486 | A1 | 11/2022 |

* cited by examiner

VEHICLE SEAT, IN PARTICULAR FOR AN AUTONOMOUSLY DRIVEN MOTOR VEHICLE

FIELD

The invention relates to a vehicle seat, in particular for an autonomously driven motor vehicle, the vehicle seat having a seat substructure and a backrest which is articulated on the seat substructure, the seat substructure having a base, a seat frame and adjustment kinematics which are effective between the base and the seat frame, the adjustment kinematics having a first front swing arm, a second front swing arm and a rear swing arm, the first front swing arm being articulated on the base so as to be pivotable about a first rotation axis, the second front swing arm being articulated on the first front swing arm so as to be pivotable about a second rotation axis, the second front swing arm being articulated on the seat frame so as to be pivotable about a third rotation axis, the rear swing arm being articulated on the seat frame so as to be pivotable about a fourth rotation axis, and the rear swing arm being articulated on the base so as to be pivotable about a fifth rotation axis, an angle between the first front swing arm and the second front swing arm being adjustable by a linear drive.

BACKGROUND

DE 10 2018 122 198 A1 discloses an actuating drive for a motor vehicle, in particular for a motor vehicle seat, having an electric motor which has an output shaft; a gearbox which has a spindle nut and a gearbox housing and is connected to the output shaft; having a spindle which engages with the spindle nut, and having a mounting which at least partially encompasses the gearbox housing.

In an autonomously driven motor vehicle, a vehicle driver does not have to, or does not have to continually, perform steering and/or braking and accelerating activities during the operation of the motor vehicle, the motor vehicle instead being able to operate independently of the actions of a vehicle driver. Therefore, the vehicle driver can assume a more comfortable position during autonomous driving than in conventional vehicles. A vehicle seat for an autonomously driven motor vehicle is known from DE 10 2018 203 731 A1, which vehicle seat can assume a reclined position in which a seat part and a backrest are at an angle which enables a partially reclined position of the vehicle occupant during an autonomous driving mode. The vehicle driver can take command of the vehicle in an upright position of the vehicle seat when the autonomous driving mode is switched off.

DE 198 08 235 C1 discloses a motor vehicle seat having a backrest and a seat part which by pivotable front and rear control arms is articulated on an element that is adjustable in the vehicle longitudinal direction, wherein the control arms are configured to be pivotable by way of a drive motor for the height adjustment of the seat part, and the front control arms are divided and have two lever regions which are connected to one another in an articulated manner, wherein the pivoted position of the upper lever region is able to be locked in relation to the seat part in different pivoted positions in order to adjust the inclination of the seat part.

DE 10 2008 053 475 A1 discloses an adjustable vehicle seat having a seat part which is able to be inclined, and a backrest which is mounted in the seat part and is able to be inclined, wherein the seat part at the front and the rear is pivotably mounted in bearing elements, and the bearing elements are pivotably mounted in the vehicle floor or on rails for the longitudinal adjustment of the vehicle seat, wherein the front bearing elements or the rear bearing elements are adjustable by adjustment means in such a manner that the inclination of the seat part is altered, wherein the adjustment means, when the latter are activated, activate further adjustment means for the backrest for the purpose of adjusting the inclination of the latter in such a way that the backrest is imparted compensation of the backrest angle as a consequence of the altered inclination of the seat part.

Known from CN 1 13 212 258 A and US 2019/0308527 A1 is in each case a vehicle seat having adjustment kinematics which are embodied as five-joint kinematics.

Known from DE 10 2016 015 170 A1 is a vehicle seat having a seat substructure and a backrest which is articulated on the seat substructure, the seat substructure having a base, a seat frame and adjustment kinematics which are effective between the base and the seat frame, the adjustment kinematics having a first front swing arm, a second front swing arm and a rear swing arm, the first front swing arm being articulated on the base so as to be pivotable about a first rotation axis, the second front swing arm being articulated on the first front swing arm so as to be pivotable about a second rotation axis, the second front swing arm being articulated on the seat frame so as to be pivotable about a third rotation axis, the rear swing arm being articulated on the seat frame so as to be pivotable about a fourth rotation axis, and the rear swing arm being articulated on the base so as to be pivotable about a fifth rotation axis. An angle between the first front swing arm and the second front swing arm is adjustable by a linear drive. An adjustability of the inclination of the vehicle seat is implemented in that the linear drive is supported on the second front swing arm, on the one hand, and on the seat frame or the first front swing arm, on the other hand. However, the adjustment range is small because the articulation points are disposed close to one another.

SUMMARY

The invention is based on the object of providing a vehicle seat, in particular for an autonomously driven motor vehicle, which can assume an inclined position in which a seat part and a backrest are at an angle which enables a partially reclined position of a vehicle occupant, in particular of the vehicle driver, in particular in an autonomous driving mode. The vehicle seat is intended to have a large adjustment range and nevertheless be of high strength, in particular be able to be embodied as a seat with an integrated seat belt. In particular, besides being able to assume an inclined position, the vehicle seat should also have a seat height adjuster.

The difference between a seat face inclination adjustability known from the prior art and providing an inclined position lies in that an alteration of an inclination angle of the seat face takes place in a seat face inclination adjustment, whereas an inclination angle of the backrest is not altered, while the inclination angle of the seat face as well as the inclination angle of the backrest are altered when assuming an inclined position.

This object is achieved according to the invention by a vehicle seat, in particular for an autonomously driven motor vehicle, the vehicle seat having a seat substructure and a backrest which is articulated on the seat substructure, the seat substructure having a base, a seat frame and adjustment kinematics which are effective between the base and the seat frame, the adjustment kinematics having a first front swing arm, a second front swing arm and a rear swing arm, the first front swing arm being articulated on the base so as to be pivotable about a first rotation axis, the second front swing arm being articulated on the first front swing arm so as to be pivotable about a second rotation axis, the second front swing arm being articulated on the seat frame so as to be pivotable about a third rotation axis, the rear swing arm being articulated on the seat frame so as to be pivotable about a fourth rotation axis, and the rear swing arm being articulated on the base so as to be pivotable about a fifth rotation axis, an angle between the first front swing arm and the second front swing arm being adjustable by a linear drive, wherein a first articulation point of the linear drive is articulated on the base so as to be pivotable about a sixth rotation axis, and a second articulation point of the linear drive is articulated on the second front swing arm so as to be pivotable about a seventh rotation axis.

Owing to the fact that a first articulation point of the linear drive is articulated on the base so as to be pivotable about a sixth rotation axis, and a second articulation point of the linear drive is articulated on the second front swing arm so as to be pivotable about a seventh rotation axis, the angle between the first front swing arm and the second front swing arm is adjustable by the linear drive in a larger adjustment range in comparison to the prior art. The vehicle seat according to the invention can be used in an autonomously driven motor vehicle as well as in a conventional vehicle.

The articulation points can be disposed so as to be spaced further apart than is possible in a vehicle seat known from DE 10 2016 015 170 A1. Moreover, a vehicle seat according to the invention offers advantages in terms of installation space (in particular a minor block height in the lowermost height-adjustment position) and advantages in terms of strength. The attachment according to the invention ensures that the linear adjuster, in particular a threaded spindle of a linear adjuster embodied as a spindle drive, acts as a compression strut which buckles in a targeted manner in the event of a crash, as a result moving the vehicle seat from the inclined position in the direction of an upright position in such a way that compressive forces acting on the spine of an occupant of the vehicle seat are reduced.

In a preferred embodiment of the vehicle seat according to the invention, the linear drive is embodied as a spindle drive. A linear drive is understood to be an actuator having a first articulation point for connecting to a component, in particular in a pivotable manner, and a second articulation point for connecting to a further component, in particular in a pivotable manner, wherein a spacing between the first articulation point and the second articulation pint is linearly adjustable. There are mechanical, electromechanical, direct electrical linear drives (linear motors) as well as hydraulic and pneumatic linear drives. A pneumatic linear drive is known from DE 10 2017 103 315 A1, for example.

The adjustment kinematics have a first front swing arm, a second front swing arm and a rear swing arm. The linear drive is preferably a constituent part of the adjustment kinematics.

The first front swing arm is articulated on the base so as to be pivotable about a first rotation axis. A first end region of the first front swing arm can be articulated on the base so as to be pivotable about the first rotation axis.

The second front swing arm is articulated on the first front swing arm so as to be pivotable about a second rotation axis. A first end region of the second front swing arm can be articulated on a second end region of the first front swing arm so as to be pivotable about the second rotation axis. The second front swing arm is articulated on the seat frame so as to be pivotable about a third rotation axis. A second end region of the second front swing arm can be articulated on the seat frame so as to be pivotable about the third rotation axis.

The rear swing arm is articulated on the seat frame so as to be pivotable about a fourth rotation axis. A first end region of the rear swing arm can be articulated on the seat frame so as to be pivotable about the fourth rotation axis. The rear swing arm is articulated on the base so as to be pivotable about a fifth rotation axis. A second end region of the rear swing arm can be articulated on the base so as to be pivotable about the fifth rotation axis.

A first articulation point of the linear drive can be articulated on the base so as to be pivotable about a sixth rotation axis. A second articulation point of the linear drive can be articulated on the second front swing arm so as to be pivotable about a seventh rotation axis. A spacing between the first articulation point and the second articulation point of the linear drive can be adjustable by activating the linear drive.

The first, the second, the third, the fourth, the fifth, the sixth and the seventh rotation axis preferably run parallel to one another.

The first rotation axis can be disposed below the second rotation axis. The first rotation axis can be disposed below the third rotation axis. The first rotation axis can be disposed in front of the fourth rotation axis. The first rotation axis can be disposed in front of the fifth rotation axis.

The second rotation axis can be disposed below the third rotation axis. The second rotation axis can be disposed in front of the fourth rotation axis. The second rotation axis can be disposed in front of the fifth rotation axis.

The third rotation axis can be disposed in front of the fourth rotation axis. The third rotation axis can be disposed in front of the fifth rotation axis. The fifth rotation axis can be disposed below the fourth rotation axis.

The sixth rotation axis can be disposed in front of the first rotation axis. The first rotation axis can be disposed below the sixth rotation axis.

The third rotation axis can be disposed in front of the seventh rotation axis. The seventh rotation axis can be disposed below the third rotation axis. The seventh rotation axis can be disposed between the second rotation axis and the third rotation axis. The seventh rotation axis can be disposed so as to be centric between the second rotation axis and the third rotation axis. The seventh rotation axis can intersect a connecting line between the second rotation axis and the third rotation axis.

At least one, a plurality or all, of the previously described mutual arrangements of the rotation axes can be provided in the inclined position and/or in an upright position of the vehicle seat.

An inclination angle between the first front swing arm and the base, and an inclination angle between the rear swing arm and the base, can be modifiable by an actuating drive, in particular for providing a height adjustment function.

The actuating drive can have an electric motor and a gearbox. The actuating drive can have an electric motor, a gearbox, a spindle nut and a threaded spindle. The actuating drive can connect the rear swing arm and the base to one another so as to be adjustable in terms of angle. The actuating drive can connect the rear swing arm and the base to one another so as to be adjustable in terms of angle and directly, i.e. without any intervening further gearbox elements.

In order to provide an inclined position of a vehicle seat for an autonomously driven motor vehicle, an angle between the first front swing arm and the second front swing arm can be modifiable by a linear drive. The linear drive can be a spindle drive. The spindle drive can have an electric motor, a gearbox, a spindle nut and a threaded spindle. A threaded spindle of the spindle drive can be articulated on the second front swing arm so as to be eccentrically pivotable in relation to the third rotation axis, wherein the gearbox of the spindle drive can be pivotably articulated on the base.

The base can have an adapter. The adapter can be configured on or fastened to a seat rail of a base formed as a longitudinal adjuster. The longitudinal adjuster can comprise at least the one seat rail and one floor rail which is connectable to a vehicle floor and on which the seat rail is displaceably guided. The longitudinal adjuster can have a further actuating drive for displacing the seat rail relative to the floor rail.

A seat face cushion support can be pivotably articulated on the seat frame, in particular for providing a seat face inclination adjuster. An inclination angle between the seat face cushion support and the seat frame can be adjustable by a further actuating drive.

In summary, and in other words, a vehicle seat having adjustment kinematics for providing an inclined position (relax function) in which the entire vehicle seat is pivoted about a rear floor-proximal axis is provided by the invention. The adjustment kinematics enable an increased inclination angle in the inclined position, and as a result a maximum level of comfort for the occupant, both while driving and when parking. In the inclined position, the occupant assumes a relaxed sitting position in which the muscular system of the human body is destressed (neutral position). When assuming the inclined position, the seat frame and the backrest preferably tilt to the rear about a rear transverse tube of the seat substructure. This enables an only minimal relative movement between the back and the lower body (thigh). The neutral position of the occupant is a measurable set of angles in which the spine is in its most destressed, most relaxed and most stable orientation. A spindle drive of which the threaded spindle is articulated on the base so as to be pivotable, in particular parallel to the first front swing arm, but offset from the rotation point of the first front swing arm, ensures an individual adjustment of the inclination angle. Two spindle drives (on the right and on the left) can be used to provide the inclined position in the case of comparatively high loads, typically in seats with an integrated seat belt, in order to cover the load requirement in a crash situation. A vehicle seat according to the invention, having corresponding adjustment kinematics, can particularly advantageously be used in autonomously driven vehicles in which driving with maximum comfort is required. The implementation of a second front swing arm (two front swing arms instead of only one front swing arm) enables larger adjustment angles so as to achieve an optimal and individual sitting position as required. A lower rotation point of the spindle drive can be disposed so as to be offset from the lower rotation point of the first front swing arm.

BRIEF DESCRIPTION OF THE DRAWINGS

The invention is explained in more detail hereunder with the aid of an advantageous exemplary embodiment illustrated in the figures. However, the invention is not limited to this exemplary embodiment. In the figures.

DETAILED DESCRIPTION OF THE DRAWINGS

Figure 1:
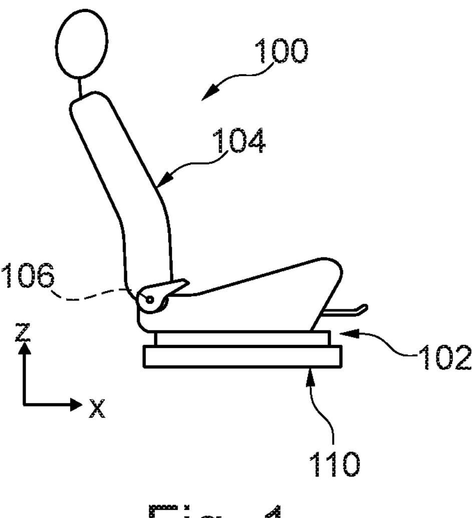
FIG. 1: shows a highly schematic lateral view of a vehicle seat according to the invention.
Figure 2:
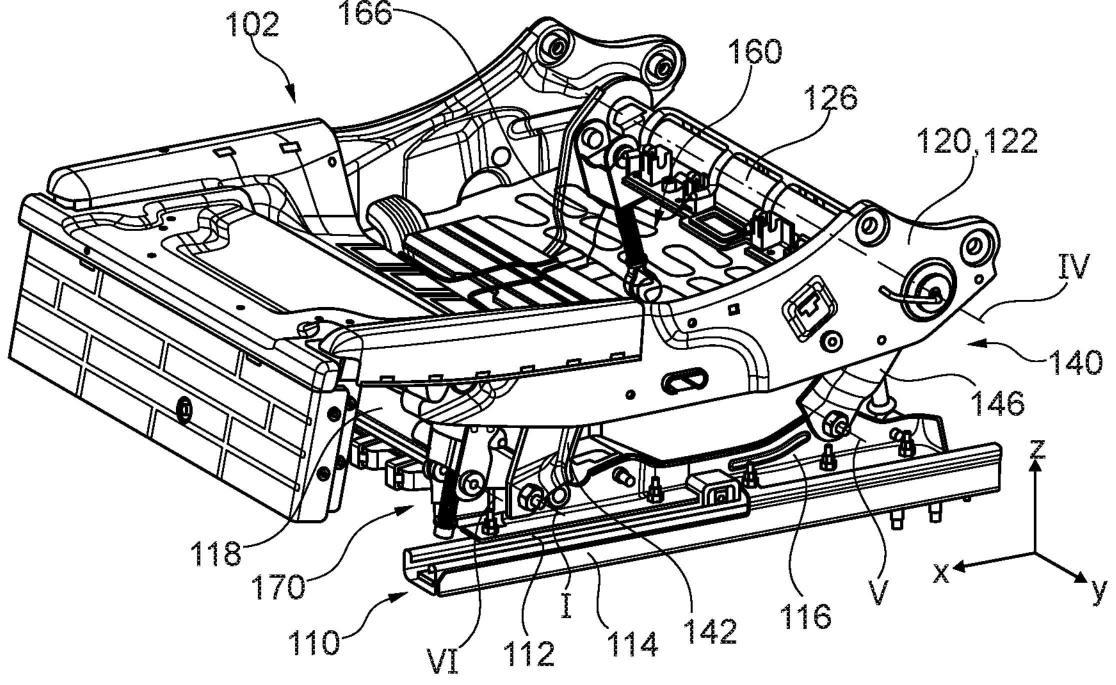
FIG. 2: shows a perspective view of a seat substructure of a vehicle seat according to the invention in an unupholstered state, wherein the vehicle seat is in an upper height-adjustment position and an upright position.
Figure 3:
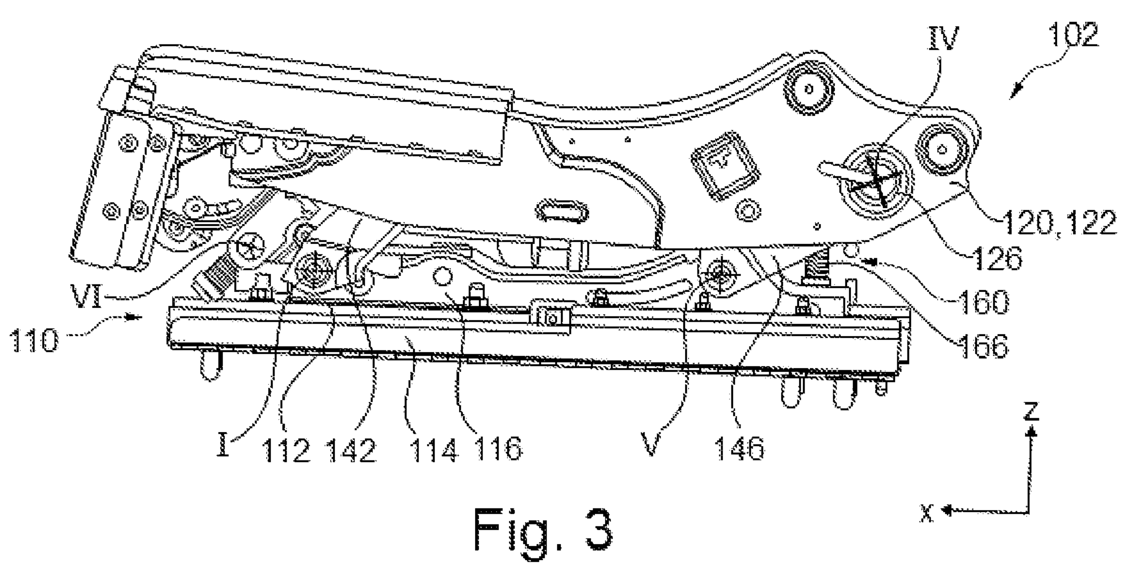
FIG. 3: shows a lateral view of the seat substructure from FIG. 2, wherein the vehicle seat is in a lower height-adjustment position and an upright position.
Figure 4:
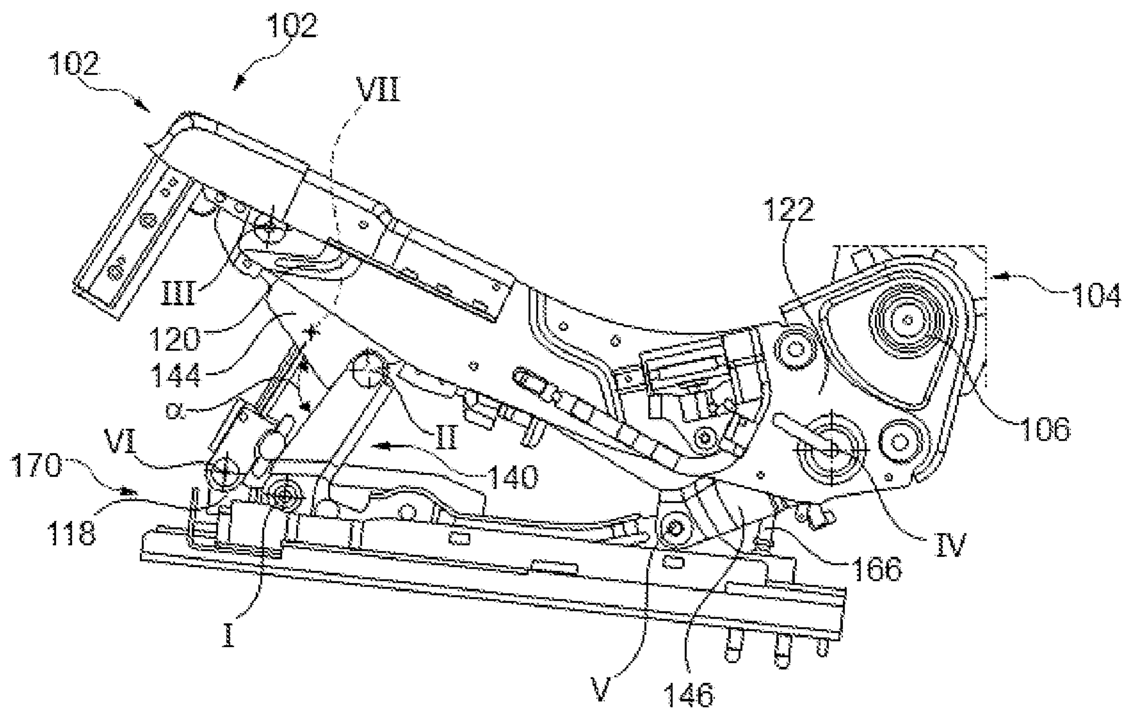
FIG. 4: shows fragments of a lateral view of the vehicle seat from FIG. 2, wherein the vehicle seat is in a lower height-adjustment position and an inclined position.
Figure 5:
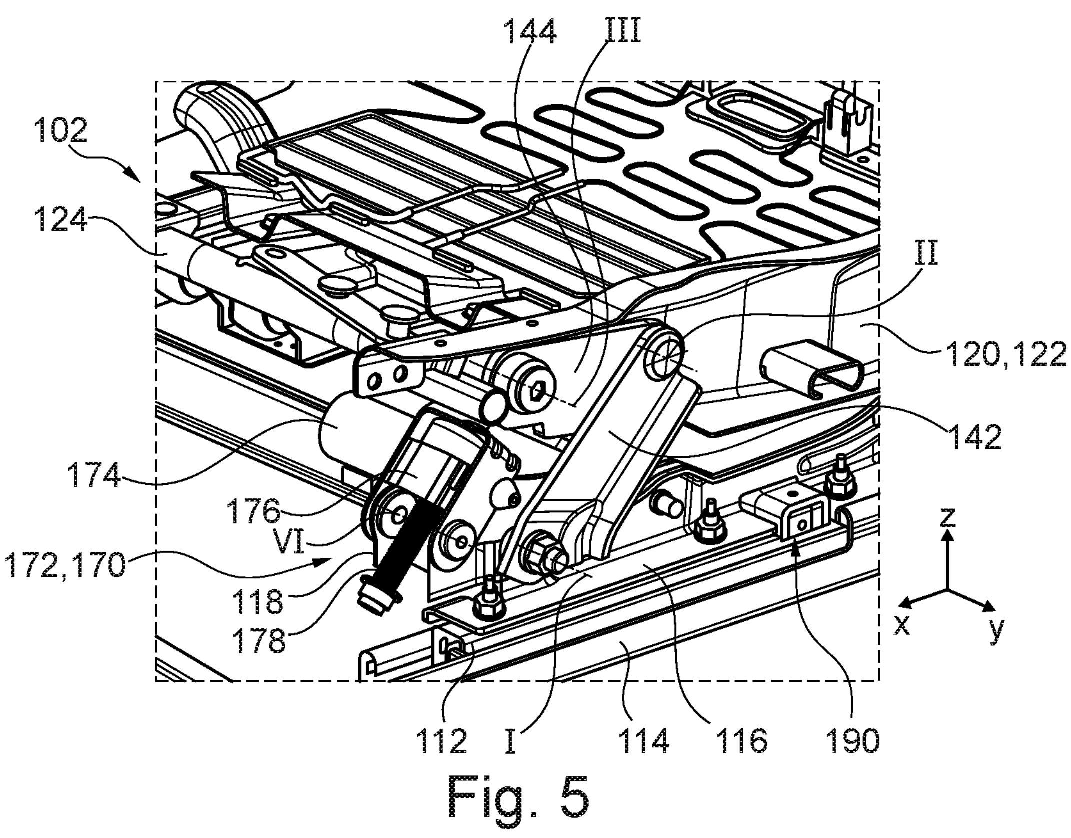
FIG. 5: shows fragments of a perspective view of the seat substructure from FIG. 2, wherein the vehicle seat is in a lower height-adjustment position and an upright position.
Figure 6:
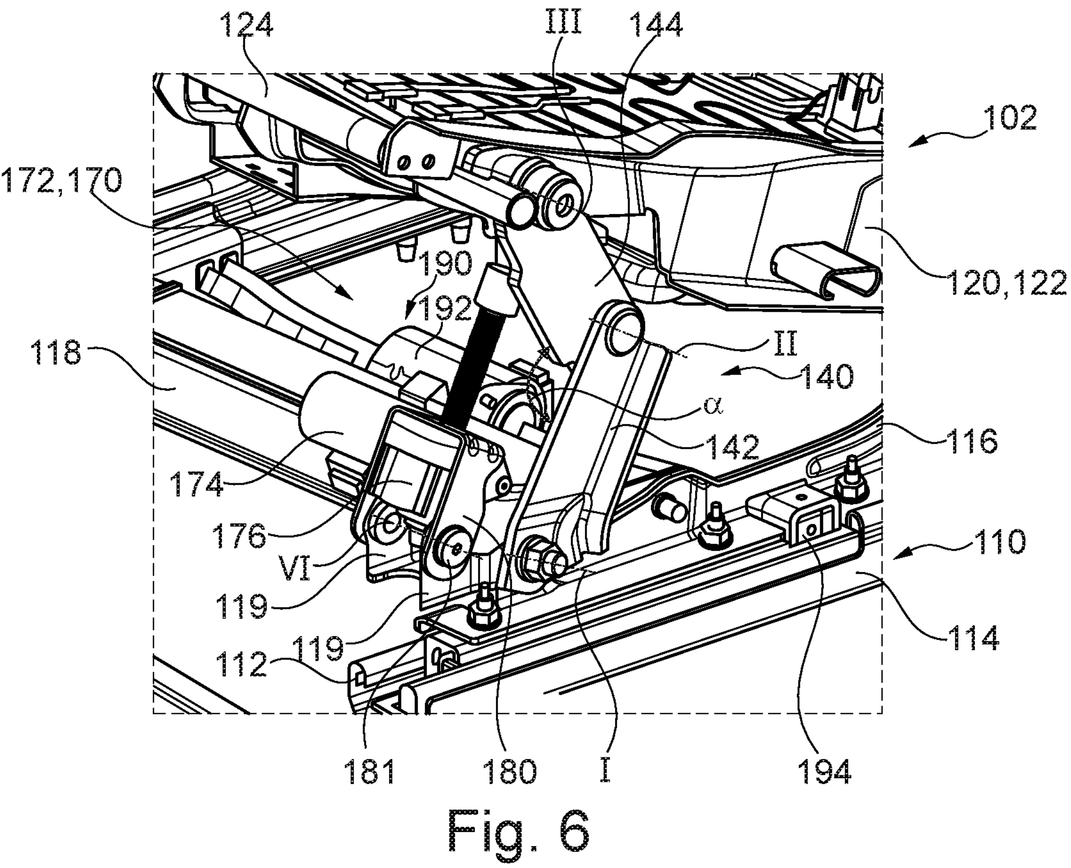
FIG. 6: shows fragments of a perspective view of the seat substructure from FIG. 2, wherein the vehicle seat is in a lower height-adjustment position and an inclined position.
Figure 7:
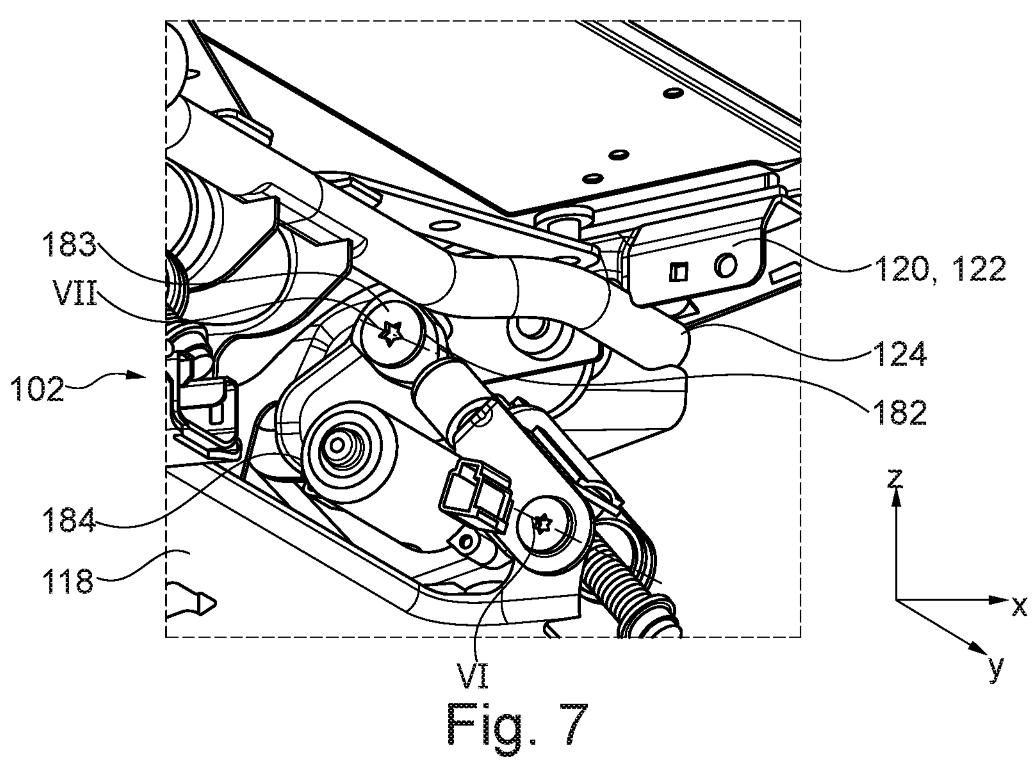
FIG. 7: shows fragments of a further perspective view of the seat substructure from FIG. 2, wherein the vehicle seat is in a lower height-adjustment position and an upright position.
Figure 8:
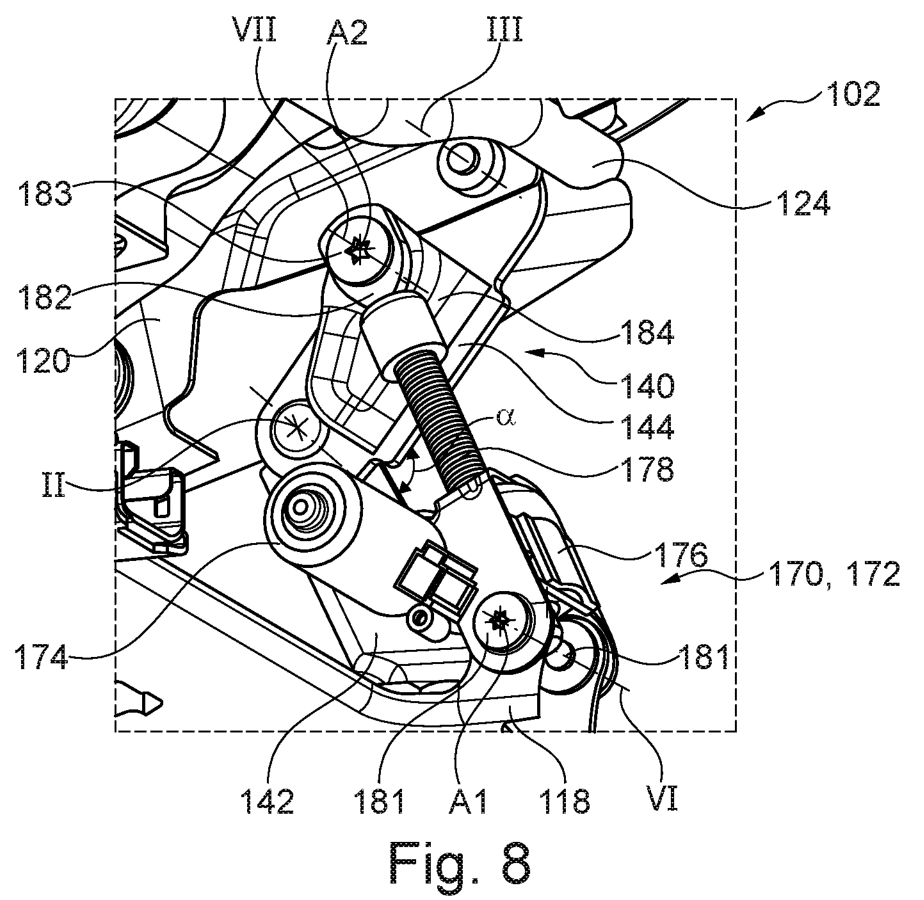
FIG. 8: shows fragments of a further perspective view of the seat substructure from FIG. 2, wherein the vehicle seat is in a lower height-adjustment position and an inclined position.

FIGS. 1 to 8 show a vehicle seat 100 according to the invention and according to an exemplary embodiment, wherein the vehicle seat 100 is illustrated in a highly schematic manner in FIG. 1.

The vehicle seat 100 will be described hereunder while using three spatial directions running perpendicularly to one another. In a vehicle seat 100 installed in the vehicle, a longitudinal direction x runs largely horizontally and preferably parallel to a vehicle longitudinal direction which corresponds to the usual direction of travel of the vehicle. A transverse direction y running perpendicularly to the longitudinal direction x is likewise horizontally aligned in the vehicle and runs parallel to a vehicle transverse direction. A vertical direction z runs perpendicularly to the longitudinal direction x and perpendicularly to the transverse direction y. In a vehicle seat 100 installed in the vehicle, the vertical direction z runs parallel to the vehicle height axis.

The positional indications and directional indications used such as, for example, left, right, front, rear, top, bottom and transverse relate to a viewing direction of an occupant sitting in the usual seated position on a seat face of a seat substructure 102 (seat part) of the vehicle seat 100, wherein the vehicle seat 100 is installed in the vehicle in a use position suitable for transporting passengers and with an upright backrest 104, and is aligned in the direction of travel, as usual. However, the vehicle seat 100 can also be installed in an alignment deviating therefrom, for example transversely to the direction of travel. Unless otherwise described, the vehicle seat 100 is constructed so as to be mirror-symmetrical in relation to a plane running perpendicularly to the transverse direction y.

The vehicle seat 100 can be embodied as a so-called seat with an integrated seat belt in which a belt system is largely completely integrated in the vehicle seat 100. An upper belt exit point here can be integrated in an upper region of the backrest 104. However, the invention is not limited to seats with an integrated belt.

The backrest 104 is on both sides connected to the seat substructure 102 so as to be adjustable for inclination by in each case one fitting 106.

The seat substructure 102 has a base 110, a seat frame 120 and adjustment kinematics 140 which are effective between the base 110 and the seat frame 120.

The base 110 presently comprises on both sides in each case one rail for the longitudinal adjustment of the vehicle seat 100. Each of the two rails has one seat rail 112 and one floor rail 114 which is connectable to a vehicle floor and on which the seat rail 112 is displaceably guided. One adapter 116 is in each case fastened to each of the two seat rails 112. The adapter 116 serves in particular for attaching elements of the adjustment kinematics 140 to the base 110. The two adapters 116 are connected to one another by a cross bridge 118. The two seat rails 112, the two adapters 116 and the cross bridge 118 are components of the base 110.

The seat frame 120 (when viewed in the transverse direction y) comprises on both sides in each case one seat frame lateral part 122. Moreover, the seat frame 120 has a front transverse tube 124 and a rear transverse tube 126. The two seat frame lateral parts 122 are disposed so as to be mutually spaced apart. The front transverse tube 124 extends between the two seat frame lateral parts 122 and is in each case fixedly connected to one of the two seat frame lateral parts 122 on both sides. The rear transverse tube 126 extends between the two seat frame lateral parts 122 and is on both sides mounted so as to be rotatable in each case on one of the two seat frame lateral parts 122. The seat frame lateral parts 122 on both sides are presently in each case one-part seat frame lateral parts 122. Alternatively however, the two seat frame lateral parts can in each case also be assembled from a plurality of sheet metal parts.

The adjustment kinematics 140 (when viewed in the transverse direction y) presently have in each case one five-joint kinematics unit on both seat sides (right-hand seat side, left-hand seat side). Because the two five-joint kinematics units are mutually mirror symmetrical, i.e. each of the five parallel rotation axes I, II, III, IV, V running in each case through one rotary joint of the five-joint kinematics unit on both sides, only one of the two five-joint kinematics units will be described hereunder. Unless otherwise described hereunder, all of the components of the adjustment kinematics 140 are present on the right-hand seat side as well as on the left-hand seat side.

The adjustment kinematics 140 on both sides have in each case one first front swing arm 142, one second front swing arm 144 and one rear swing arm 146. The first front swing arm 142 is articulated on the base 110, presently the adapter 116 of the base 110, so as to be pivotable about a first rotation axis I. The second front swing arm 144 is articulated on the first front swing arm 142 so as to be pivotable about a second rotation axis II. The second front swing arm 144 is articulated on the seat frame 120 so as to be pivotable about a third rotation axis III. The rear swing arm 146 is articulated on the seat frame 120 so as to be pivotable about a fourth rotation axis IV. The rear swing arm 146 is articulated on the base 110, presently the adapter 116 of the base 110, so as to be pivotable about a fifth rotation axis V. The rotation axes I, II, III, IV, V run parallel to one another and parallel to the transverse direction y. Each of the rotation axes I, II, III, IV, V runs in each case so as to be spaced apart from all of the other rotation axes I, II, III, IV, V.

In order to provide a height adjustment function, the adjustment kinematics 140 have an actuating drive 160. A spacing between the base 110 and the seat frame 120 is adjustable by the actuating drive 160.

The two rear swing arms 146 are presently co-rotationally connected to the rear transverse tube 126, in particular welded thereto. The rear transverse tube 126, and thus the two rear swing arms 146, are mounted on the seat frame lateral parts 122 of the seat frame 120 so as to be pivotable about the fourth rotation axis IV. Alternatively, the rear transverse tube 126 can be co-rotationally connected to the seat frame lateral parts 122 of the seat frame 120, in particular welded thereto, and the two rear swing arms 146 can be pivotably mounted on the rear transverse tube 126.

The actuating drive 160 preferably has an electric motor, a gearbox, a spindle nut and a spindle 166. The spindle nut is a rotatable and drivable constituent part of the gearbox, and preferably disposed in a gearbox housing of the gearbox. The actuating drive 160 connects the rear swing arm 146 and the base 110 to one another so as to be adjustable in terms of angle and preferably directly, i.e. not by way of further gearbox elements of the adjustment kinematics 140. For this purpose, the motor and the gearbox are articulated on the rear swing arm 146 so as to be eccentric in relation to the fifth rotation axis V. The spindle 166 is pivotably connected to the adapter 116 of the base 110.

The gearbox of the actuating drive 160 has the spindle nut which is drivable by the motor and into which the spindle 166 is screwed. The spindle nut rotates by activating the motor, so that the spindle 166 is moved relative to the gearbox housing and pivots the rear swing arm 146, as a result of which the seat frame lateral part 122 is imparted a change in height while simultaneously pivoting the first front swing arm 142 and the second front swing arm 144 in a defined manner. The pivoting movements of the first front swing arm 142 and of the second front swing arm 144 that take place in the process will yet be discussed in more detail hereunder.

In order to provide an inclined position of the seat frame 120 and of the backrest 104, the adjustment kinematics 140 have a linear drive 170 which is presently embodied as a spindle drive 172. The linear drive 170 can be disposed on exactly one side of the vehicle seat 100 and serve the drive of the five-joint kinematics unit disposed on this side for moving the vehicle seat 100 from an upright position (illustrated in FIGS. 2, 3, 5 and 7) to the inclined position (illustrated in FIGS. 4, 6 and 8). The linear drive 170 is a drive as well as a constituent part of the adjustment kinematics 140, in that the linear drive 170 serves as a variable-length coupler between the base 110 and the second front swing arm 144.

Alternatively, one linear drive 170 can in each case be disposed on both sides of the vehicle seat 100, and in each case be assigned to one of the two five-joint kinematics units.

The seat frame 120 can be raised in its front region and pivoted about the fourth rotation axis IV by the linear drive 170 in such a way that the inclined position of the seat frame 120 and of the backrest 104, and thus of the vehicle seat 100, is provided.

In the inclined position, the seat frame 120 and the backrest 104 are in each case inclined to the rear in relation to an upright position about an axis parallel to the transverse direction y, presently about the fourth rotation axis IV, in such a way that a partially reclined position of the vehicle driver is enabled, in particular during an autonomous driving mode. The upright position of the vehicle seat 100 corresponds to a sitting position in which the vehicle driver can safely assume command of the vehicle when the autonomous driving mode is switched off.

The linear drive 170, which is embodied as a spindle drive 172, has an electric motor 174, a gearbox 176, a spindle nut and a threaded spindle 178. The spindle drive 172 connects the base 110 and the second front swing arm 144 to one another, in particular in a manner as will yet be described hereunder.

Should a spindle drive 172 be provided only on one side, the two second front swing arms 144 are preferably connected to one another by a connecting tube and thus synchronized in terms of their pivoting movements.

A first articulation point A1 of the spindle drive 172 is articulated on the base 110 so as to be pivotable about a sixth rotation axis VI. For this purpose, the gearbox 176 and preferably also the electric motor 174 are fastened to a gearbox adapter 180 which is articulated on the cross bridge 118 of the base 110 so as to be pivotable about the sixth rotation axis VI. The gearbox adapter 180 is presently a U-shaped sheet metal plate which at least partially encloses a gearbox housing of the gearbox 176 and has one web and two legs. The web has an opening for passing through the threaded spindle 178. Both legs have in each case one opening for receiving a bolt 181, said opening being in an end region that faces away from the web. The bolts 181 are mounted in bearing eyes 119 of the cross bridge 118. In this way, the gearbox 176 is articulated on the base 110 so as to be pivotable about the sixth rotation axis VI.

A second articulation point A2 of the spindle drive 172 is articulated on the second front swing arm 144 so as to be pivotable about a seventh rotation axis VII. For this purpose, an end of the threaded spindle 178 that faces away from the sixth rotation axis VI has a fastening eye 182 which is pivotably articulated on a fastening plate 184 of the front swing arm 144, presently by a bolt 183. In this way, the end of the threaded spindle 178 that faces away from the gearbox 176 is articulated on the second front swing arm 144 so as to be pivotable about the seventh rotation axis VII.

A spacing between the first articulation point A1 and the second articulation point A2 of the spindle drive 172 is adjustable by activating the electric motor 174.

The sixth rotation axis VI runs so as to be spaced apart from the first rotation axis I. The sixth rotation axis VI runs parallel to the first rotation axis I. The sixth rotation axis VI is disposed above the first rotation axis I. The sixth rotation axis VI is disposed in front of the first rotation axis I.

The seventh rotation axis VII runs so as to be spaced apart from the third rotation axis III. The seventh rotation axis VII runs parallel to the third rotation axis III. The seventh rotation axis VII is disposed below the third rotation axis III. The seventh rotation axis VII is disposed behind the first rotation axis I.

The threaded spindle 178 preferably runs parallel to the first front swing arm 142, at least in one of a plurality of adjusted positions of the spindle drive 172. As a result, an influence of the height adjustment on the inclination angle of the seat substructure 102 is comparable to a four-joint kinematics—height adjustment kinematics unit known from the prior art. Disadvantages which are theoretically derived from the 5-joint kinematics unit in terms of the inclination angle of the seat substructure 102 (undesirable superimposed adjustment of inclination by the height adjustment) are thus avoided.

The spindle drive 172 acts as a length-adjustable coupler of the adjustment kinematics 140. The first front swing arm 142, the second front swing arm 144, the spindle drive 172 and the base 110, conjointly with the first, the second, the six and the seventh rotation axis, form a four-joint kinematics unit as partial kinematics of the adjustment kinematics 140, wherein these partial kinematics are adjustable by adjusting the spindle drive 172. Owing to the fact that the third rotation axis is disposed so as to be spaced apart from the seventh rotation axis, the inclined position can be achieved by adjusting the four-joint kinematics unit. As a result of this four-joint kinematics unit, a front region of the seat frame 120 is pivotably articulated on the base 110 and follows a pivoting movement of the rear swing arm 146 for a height adjustment.

A further actuating drive 190 serves for longitudinal adjustment, i.e. for displacing the seat rail 112 relative to the floor rail 114. The further actuating drive 190, in a manner known per se, has an electric motor 192, a gearbox 194, a spindle nut and a spindle which is disposed in a cavity between the seat rail 112 and the floor rail 114.

The vehicle seat 100 is largely mirror symmetrical in relation to a plane running perpendicularly to the transverse direction y, and in particular has in each case one actuating drive 160 and one linear drive 170 on both sides. The electric motor 192 of the further actuating drive 190 (when viewed in the transverse direction y) is disposed so as to be approximately centric, and is present only once.

The features disclosed in the above description, in the claims and in the figures may be both individually and collectively of importance for the implementation of the invention in its various configurations, insofar as they remain within the scope of protection of the claims.

LIST OF REFERENCE SIGNS

100 Vehicle seat
102 Seat substructure
104 Backrest
106 Fitting
110 Base
112 Seat rail
114 Floor rail
116 Adapter
118 Cross bridge
119 Bearing eye
120 Seat frame
122 Seat frame lateral part
140 Adjustment kinematics
142 First front swing arm
144 Second front swing arm
146 Rear swing arm
160 Actuating drive
166 Threaded spindle
170 Linear drive
172 Spindle drive
174 Electric motor
176 Gearbox
178 Threaded spindle
180 Gearbox adapter
181 Bolt
182 Fastening eye
183 Bolt
184 Fastening plate
190 Further actuating drive
192 Electric motor
194 Gearbox
a Angle
I First rotation axis
II Second rotation axis
III Third rotation axis
IV Fourth rotation axis
V Fifth rotation axis
VI Sixth rotation axis
VII Seventh rotation axis
A1 First articulation point A2 Second articulation point
x Longitudinal direction
y Transverse direction
z Vertical direction

What is claimed is:

1. A vehicle seat for a motor vehicle, the vehicle seat having (a) a seat substructure and (b) a backrest articulated on the seat substructure, the seat substructure having (i) a base, (ii) a seat frame and (iii) adjustment kinematics effective between the base and the seat frame, the adjustment kinematics having a first front swing arm, a second front swing arm and a rear swing arm, the first front swing arm being articulated on the base so as to be pivotable about a first rotation axis, the second front swing arm being articulated on the first front swing arm so as to be pivotable about a second rotation axis, the second front swing arm being articulated on the seat frame so as to be pivotable about a third rotation axis, the rear swing arm being articulated on the seat frame so as to be pivotable about a fourth rotation axis, and the rear swing arm being articulated on the base so as to be pivotable about a fifth rotation axis, an angle between the first front swing arm and the second front swing arm being adjustable by a linear drive, wherein a first articulation point of the linear drive is articulated on the base so as to be pivotable about a sixth rotation axis, and a second articulation point of the linear drive is articulated on the second front swing arm so as to be pivotable about a seventh rotation axis.

2. The vehicle seat as claimed in claim 1, wherein the linear drive is embodied as a spindle drive.

3. The vehicle seat as claimed in claim 2, wherein the spindle drive has an electric motor, a gearbox having a spindle nut, and a threaded spindle which is screwed into the spindle nut.

4. The vehicle seat as claimed in claim 3, wherein the gearbox in the first articulation point is articulated on the base so as to be pivotable about the sixth rotation axis, and an end of the threaded spindle that faces away from the gearbox in the second articulation point is articulated on the second front swing arm so as to be pivotable about the seventh rotation axis.

5. The vehicle seat as claimed in claim 3, wherein the threaded spindle runs spaced apart from the first front swing arm.

6. The vehicle seat as claimed in claim 3, wherein the threaded spindle runs parallel to the first front swing arm in at least one position of the vehicle seat.

7. The vehicle seat as claimed in claim 1, wherein the sixth rotation axis runs parallel to and spaced apart from the first rotation axis.

8. The vehicle seat as claimed in claim 1, wherein the seventh rotation axis runs parallel to and spaced apart from the third rotation axis.

9. The vehicle seat as claimed in claim 1, wherein the linear drive acts as a length-adjustable coupler of the adjustment kinematics.

10. The vehicle seat as claimed in claim 1, wherein the base has a longitudinal adjuster, the longitudinal adjuster comprising at least the one seat rail and one floor rail which is connectable to a vehicle floor and on which the seat rail is displaceably guided.

11. The vehicle seat of claim 1, wherein the vehicle seat is adapted for use in an autonomously driven motor vehicle.

* * * * *